Oct. 31, 1939.  S. L. GIBSON  2,178,168
OUTLET BOX WITH ADJUSTABLE SUPPORT
Filed Dec. 2, 1937
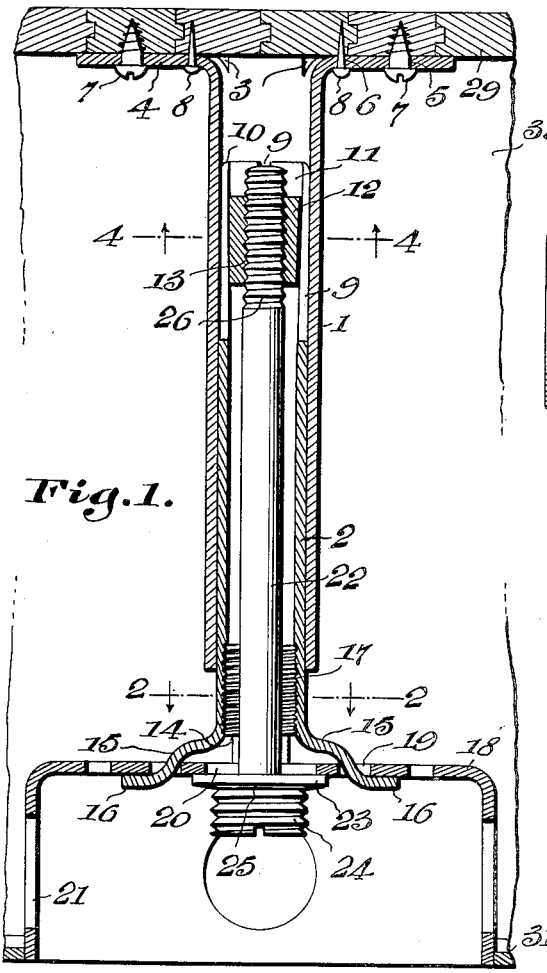
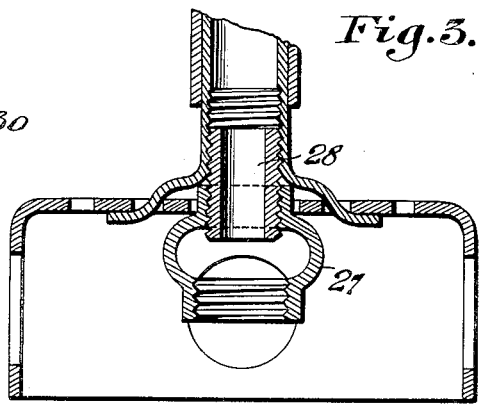
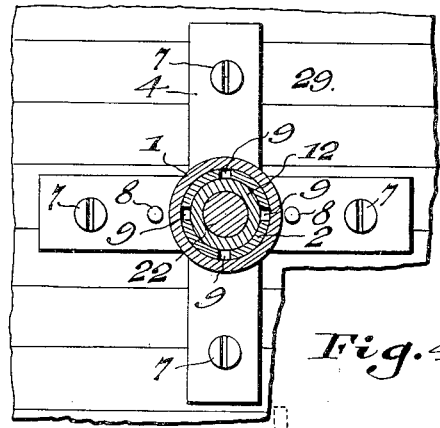
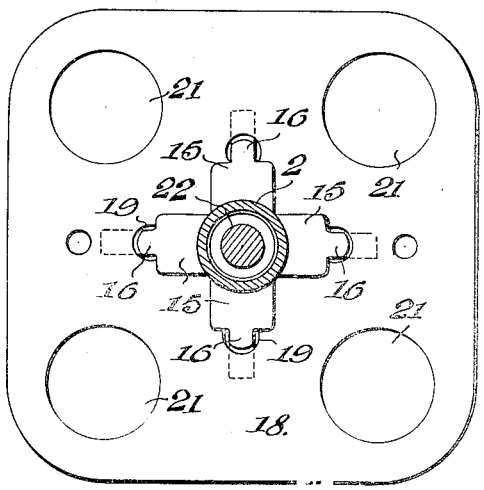
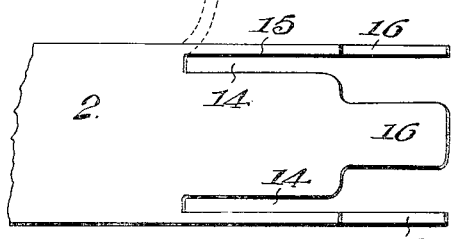
Inventor
S. L. Gibson
Albert E. Dieterich
and
By Theodore H. Rutley
Attorney Patented Oct. 31, 1939

2,178,168

UNITED STATES PATENT OFFICE 2,178,168

OUTLET BOX WITH ADJUSTABLE SUPPORT

Samuel Leonard Gibson, Bryson City, N. C.

Application December 2, 1937, Serial No. 177,785

3 Claims. (Cl. 174—63)

My invention relates to outlet boxes and it primarily has for its object to provide an adjustable support which will allow the outlet box to be mounted with a minimum amount of labor.

Further it is an object of my invention to provide an outlet box with adjustable support which can be mounted in place within the walls or ceilings of a building without damage to the walls or ceiling.

Further it is an object of my invention to provide a device of this nature which may be adjusted in cases where the walls or ceiling are to be changed in thickness.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a cross sectional elevation of the device, mounted between a floor and ceiling.

Fig. 2 is a cross section taken on the line 2—2 of Fig. 1 and shows the outside top of the box in plan.

Fig. 3 shows a portion of the device in cross sectional elevation with the short fixture stud threaded in place.

Fig. 4 is a cross section taken on the line 4—4 of Fig. 1 showing the floor mounting in plan.

Fig. 5 is an enlarged detail showing the manner in which the lower end of the inner telescoping member is formed.

In the drawing, in which like numerals of reference indicate like parts in all of the figures, 1 represents the outer telescoping member, split at its remote end as at 3 and flared out as at 4.

The flared out portions 4 each have a hole 5 to receive the screws 7 and two of the flared portions have holes 6 to receive the temporary retaining nails 8.

2 indicates the inner telescoping member split at its inner end as at 9 to form the springy fingers 11 bent over at 10.

12 indicates a wedge block having its inner bore threaded as at 13.

The remote end of 2 is slit as at 14 and flared out at 15 to form the fingers 16 which lock the member 2 to the box 18 through the small holes 19.

20 indicates the center hole of the box 18 and 21 represents knock-out pieces located in the sides and top of the box 18.

22 indicates a long fixture stud having a shoulder or flange 23. The stud 22 is threaded at 24 to receive, when desired, the short fixture stud 27. A kerf 25 is provided in the threaded portion of the stud 22 to allow a screw driver to be used thereon so as to screw the threaded end 26 into 12 by way of the threads 13.

The member 2 is threaded at 17 to receive the threaded pipe 28 on which the short fixture stud 27 may be threaded.

The floor of a building is indicated by 29, the joist by 30 and the ceiling by 31.

When the device is used in a building that has been finished off it is not necessary to take ceiling or plaster off from one joist to the other, or to remove a portion of the floor above in order to secure the adjustable box.

The wireman cuts a hole in the ceiling the size of the outlet box to be used.

He then places the nails 8 in the holes 6 and inserts piece 1 into a larger pipe or tool so that the nail heads 8 will rest against the end of the larger pipe.

He then inserts this combination into the hole in the ceiling until the flared portions 4 are flush with the floor above, and taps the end of the pipe with a hammer so that the nails will hold the piece 1 in place until screwed by the screws 7. With this method it can readily be seen that the correct location is easily found.

With the piece 1 fastened to the floor piece 2 is inserted therein until it is flush with the ceiling and the stud 22 threaded into the wedge 12 until the wedge is drawn tight, whereupon the stud may be removed if so desired. A tool threaded on its end as is the stud 22 may be used in place thereof.

To remove the box a stud or tool is threaded into the wedge piece 12 a short way and then the bottom of the tool or stud is tapped driving the wedge toward the floor which loosens the parts allowing them to be separated.

The short fixture stud 27 may be used by employing the threaded piece 28 threaded in piece 2 at 17.

In using the device as a wall box the procedure is the same except that piece 1 is secured to the studding or a plank attached to the studding.

What I claim is:

1. In a device of the character described, a pair of telescoping tubular members, the remote ends of which are split and flared outwardly to lie in a plane normal to the axis of said pair of tubular members, the flared portion of one member having holes to receive fastening elements when in use, the flared portion of the other of said members having fingers, an outlet box having holes through which said fingers project and securing said box to said other member, and means to secure said telescoping tubular members together in any of a number of adjusted positions.

2. In a device of the character described, a pair of telescoping tubular members, the remote ends of which are split and flared outwardly to lie in a plane normal to the axis of said pair of tubular members, the flared portion of one member having holes to receive fastening elements when in use, the flared portion of the other of said members having fingers, an outlet box having holes through which said fingers project and securing said box to said other member and means to secure said telescoping tubular members together in any of a number of adjusted positions comprising springy elements on the inner telescoping member and means carried by said inner telescoping member for expanding said springy elements into tight frictional engagement with the outer telescoping member.

3. In a device of the characted described, a pair of telescoping tubular members, the remote ends of which are longitudinally split and outwardly flared portions, the flared portion of one member having holes to receive fastening elements when in use, the flared portion of the other of said members having approximately radially disposed fingers, an outlet box having holes through which said fingers project for securing said box to said member having the fingers, means to secure said telescoping tubular members together in any of a number of adjusted positions, said last named means comprising springy elements on the inner telescoping member and means carried by said inner telescoping member for expanding said springy elements into tight frictional engagement with the outer telescoping member, said expanding means comprising a wedge block, a long fixture stud having a shoulder at one end and having means at its other end to engage with said wedge block to move the wedge block to its wedging position, said shoulder while said stud is in use being adapted for engaging the box end of said inner telescoping member.

SAMUEL LEONARD GIBSON.